(12) United States Patent
Sampaio

(10) Patent No.: US 8,789,781 B2
(45) Date of Patent: Jul. 29, 2014

(54) ROTARY GRATER WITH STORAGE DEVICE

(75) Inventor: Andre Sampaio, Valley Cottage, NY (US)

(73) Assignee: Casabella Holdings, LLC, Congers, NY (US)

( * ) Notice: Subject to any disclaimer, the term of this patent is extended or adjusted under 35 U.S.C. 154(b) by 28 days.

(21) Appl. No.: 13/559,147

(22) Filed: Jul. 26, 2012

(65) Prior Publication Data

US 2014/0014751 A1 Jan. 16, 2014

Related U.S. Application Data

(60) Provisional application No. 61/671,244, filed on Jul. 13, 2012.

(51) Int. Cl.
*A47J 43/25* (2006.01)

(52) U.S. Cl.
USPC .......................................... 241/93; 241/169.2

(58) Field of Classification Search
USPC ................ 241/168, 169.1, 169.2, 273.3, 37.5
See application file for complete search history.

(56) References Cited

U.S. PATENT DOCUMENTS

| | | | | | |
|---|---|---|---|---|---|
| 1,468,311 | A | * | 9/1923 | Lengyel | 241/100 |
| 2,502,867 | A | * | 4/1950 | Mantelet | 241/273.3 |
| 2,604,916 | A | * | 7/1952 | Mantelet | 241/273.3 |
| 2,804,896 | A | * | 9/1957 | Silberberg | 241/273.3 |
| 3,581,790 | A | | 6/1971 | Del Conte | |
| 5,156,084 | A | | 10/1992 | Lin | |
| 5,364,037 | A | * | 11/1994 | Bigelow | 241/93 |
| 5,702,061 | A | * | 12/1997 | Kennedy et al. | 241/93 |
| D397,919 | S | | 9/1998 | Chiu | |
| 5,803,378 | A | * | 9/1998 | Wolters | 241/93 |
| 6,244,529 | B1 | * | 6/2001 | Tardif et al. | 241/93 |
| D477,503 | S | | 7/2003 | Wong | |
| D480,613 | S | | 10/2003 | Wong | |
| 6,766,972 | B1 | * | 7/2004 | Prommel et al. | 241/93 |
| 7,204,440 | B2 | | 4/2007 | Fouse | |
| 7,337,997 | B2 | | 3/2008 | Ko | |
| 7,635,101 | B1 | * | 12/2009 | Mah et al. | 241/92 |
| 7,648,088 | B2 | | 1/2010 | Eikelenberg | |
| 7,793,875 | B2 | * | 9/2010 | Hurst | 241/169.1 |
| 7,806,352 | B1 | * | 10/2010 | Reimann et al. | 241/93 |
| 7,819,350 | B2 | | 10/2010 | Greiner | |
| D648,990 | S | | 11/2011 | Chan | |
| 8,567,704 | B2 | * | 10/2013 | Bagley | 241/93 |
| 2006/0076442 | A1 | | 4/2006 | Fouse | |
| 2008/0017737 | A1 | * | 1/2008 | So et al. | 241/93 |
| 2008/0116306 | A1 | | 5/2008 | Ko | |
| 2009/0212142 | A1 | | 8/2009 | Greiner | |
| 2010/0270406 | A1 | * | 10/2010 | Grace et al. | 241/93 |

FOREIGN PATENT DOCUMENTS

DE 102007028046 A1 12/2008
GB 2447285 10/2008

* cited by examiner

*Primary Examiner* — Faye Francis
(74) *Attorney, Agent, or Firm* — Curtis, Mallet-Prevost, Colt & Mosle LLP

(57) ABSTRACT

A rotary grater having a removable storage device is disclosed. The rotary grater has interchangeable cylindrical blades for various grating purposes. A removable handle provides for rotational motion for the cylindrical blade to operate. The housing of the rotary grater has a movable press with a lever for applying the material to be grated to the cylindrical blade. The grated material is then dispensed from an exit opening in the housing and retained by a removable storage device.

19 Claims, 13 Drawing Sheets

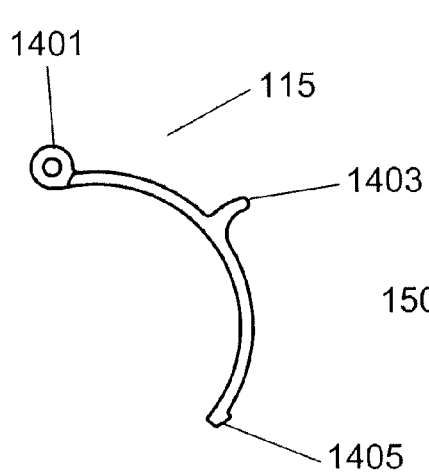
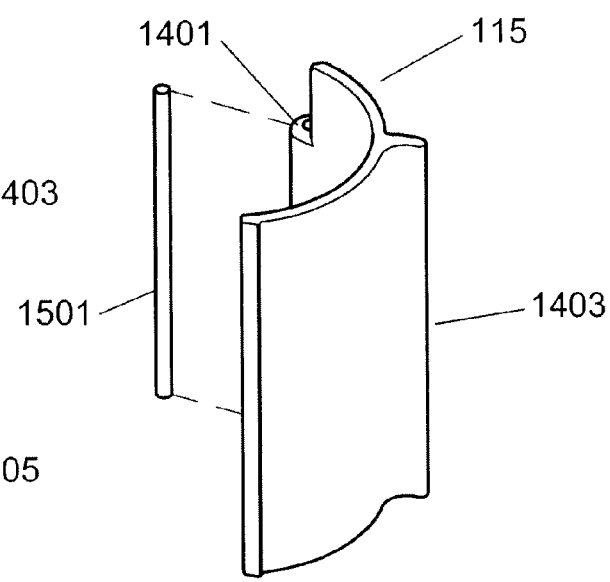
Fig. 14
Fig. 15
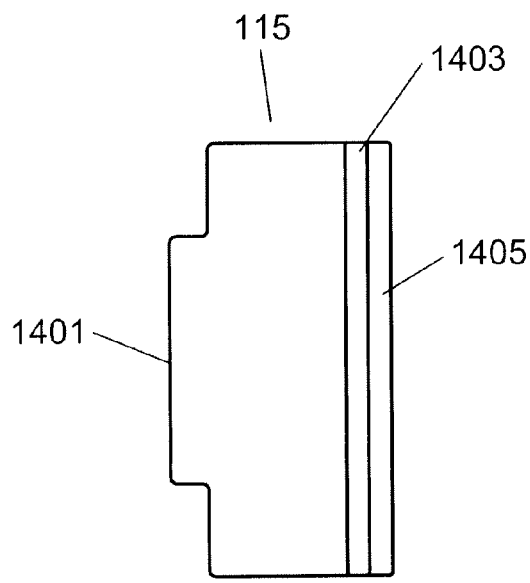
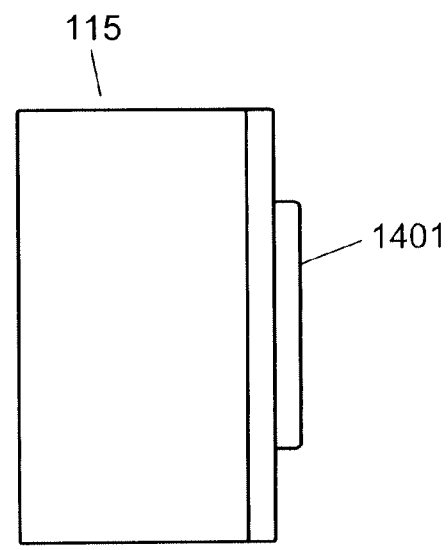
Fig. 16
Fig. 17

ROTARY GRATER WITH STORAGE DEVICE

CROSS-REFERENCE TO RELATED PATENT APPLICATIONS

This application claims the benefit of the filing date of U.S. Provisional Patent Application No. 61/671,244 filed on Jul. 13, 2012, the entire disclosure of which is incorporated herein by reference in its entirety.

BACKGROUND OF THE INVENTION

1. Field of the Invention

This invention relates generally to food processing devices, and more specifically to a rotary grater having a storage device.

2. Description of Related Art

Grating various materials such as food products has proven very useful in the preparation of many culinary dishes. Graters such as box graters and planar graters have existed for many years. In fact, the first cheese grater was invented by Francois Boullier, who developed a grater in the 1540's so that hard cheeses could still be used. In the $16^{th}$ century, there was a cheese surplus because many farmers had converted their cattle herds to dairy production in response to the current thinking of the time to avoid meat consumption. This resulted in a surplus of dairy, and the market became flooded with cheese. There was more cheese than buyers, and much of it became hard. Thus, Francois Boullier invented the cheese grater to put to use hard cheese that would otherwise be discarded. His invention became very popular in Paris in the 1540's. Unfortunately, in 1555 a drought hit Europe, drastically reducing dairy production, ending the surplus of cheese and also ending the popularity of his invention. It was not until the 1920's that an entrepreneur in Philadelphia by the name of Jeffrey Taylor once again made cheese graters popular during the great depression by allowing one to stretch the amount of cheese in a recipe. Taylor owned a cheese shop, and made his first units from shower drains with sharpened openings after reading about Boullier's invention. It was sold as the "greater", as it made small portions of cheese appear greater.

Graters are commonly made of a metal such as stainless steel, and have perforations throughout. These perforations are commonly round or oval, and have a raised side to facilitate grating of the food product. These perforations may vary in size and number depending on the particular application. For example, cheese may be grated course or fine, and the size of the perforations will dictate the size of the grated pieces. Very small perforations may be desirable in applications such as the grating of spices such as, for example, nutmeg. The grating of other materials, such as citrus rind, may require medium to fine perforations. Typically, a well equipped kitchen will have several size graters to accommodate various culinary applications. While box and planar graters are useful, they are also labor intensive and represent a risk of skinned knuckles or fingers. Rotating graters that employ, for example, a rotating disk either driven manually or by a small electric motor, speed up the process of grating food products and reduce the risk of injury to the user.

What is needed is a rotary grater that has interchangeable blades to accommodate various grating applications and a removable handle to facilitate blade interchange.

What is also needed is a rotary grater that has a removable storage device configured so that the grated material is deposited into the removable storage device. A lid that is stored on the removable storage device when not in use is also desirable.

What is also needed is a press to apply uniform pressure to the food product while being grated and to maintain a fixed and uniform force of the food product on the cylindrical blade as the food product becomes smaller during grating operations.

BRIEF SUMMARY OF THE INVENTION

In accordance with the present invention, there is provided a rotary grater comprising a housing formed generally as an elliptical cylinder, a cylindrical blade disposed within the housing, a handle connected to the cylindrical blade, an entry opening in the housing for receiving a material to be grated, an exit opening in the housing located below the cylindrical blade for dispensing grated material, a handle opening in the housing to facilitate connection of the handle to the cylindrical blade, a press movably connected to the housing, a lever connected to the press, and a storage device formed generally as an elliptical cylinder and removably connected to the housing for receiving and storing grated material.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which:

FIG. 14 is a top plan view of the press of the rotary grater;

FIG. 15 is a perspective view of the press of the rotary grater showing the hinge rod;

FIG. 16 is a plan view of the outside of the press of the rotary grater;

FIG. 17 is a plan view of the inside of the press of the rotary grater;

Figure 1:
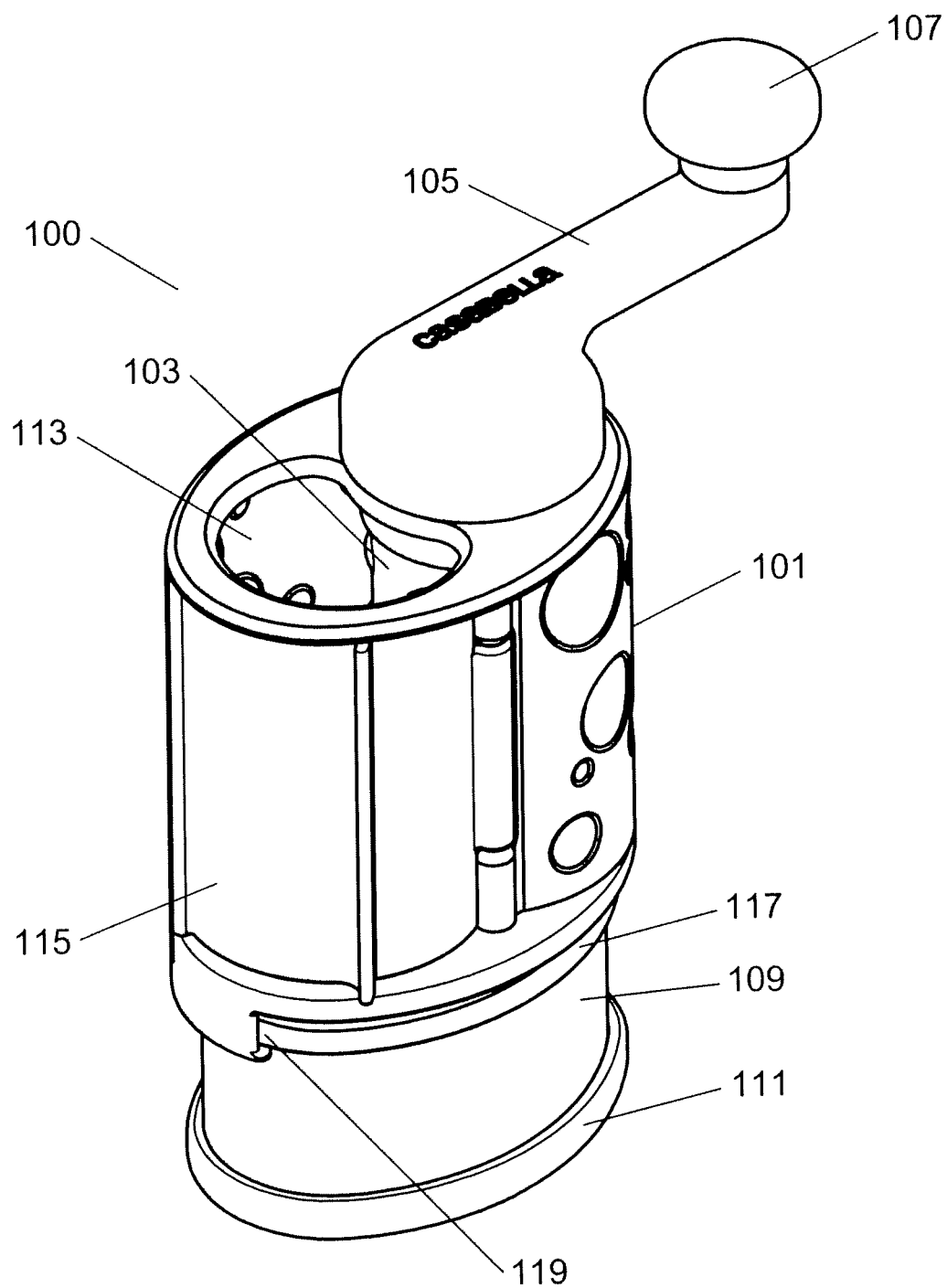
FIG. 1 is a perspective view of the rotary grater with storage device.

The attached figures depict various views of the rotary grater with storage device in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A Rotary Grater With Storage Device is described and depicted by way of this specification and the attached drawings.

For a general understanding of the present invention, reference is made to the drawings. In the drawings, like reference numerals have been used throughout to designate identical elements.

Referring to FIG. 1, a perspective view of the rotary grater with storage device 100 is depicted. The rotary grater comprises a housing 101 formed generally as an elliptical cylinder. The housing 101 may be made from a material such as a plastic that is injection molded and contains features that will be further described and depicted herein. A suitable plastic is, for example, acrylonitrile butadiene styrene (ABS). While the housing 101 is formed generally as an elliptical cylinder (also known as an elliptic cylinder), other geometries such as a cylinder, a parabolic cylinder, a hyperbolic cylinder, and the like, are considered within the spirit and broad scope of the present invention. A cylindrical blade 103 is disposed within the housing. The cylindrical blade 103 is made from a metal, such as a stainless steel, and has perforations as can be seen in the drawings. The perforations may, in some embodiments of the present invention, have a raised area around one side of each perforation to facilitate grating. The cylindrical blade 103 may be stamped from a sheet of metal to provide perforations and a raised area, and then rolled into a cylinder with the ends joined together by way of welding, crimping, or the like. The cylindrical blade 103 has a hub arrangement (not shown in FIG. 1) to facilitate removable connection of a handle 105 to the cylindrical blade. A handle opening (not shown in FIG. 1, see FIG. 2) provides for the connection of the handle 105 to the cylindrical blade 103. The handle 105 may be made from a plastic and may have, in some embodiments of the present invention, a knob 107. A suitable plastic for the handle 105 and the knob 107 being, for example, acrylonitrile butadiene styrene (ABS). There is also an entry opening 113 in the housing 101 for receiving material to be grated. The entry opening may be a variety of sizes and geometries. There is also an exit opening (not depicted in FIG. 1, see FIG. 11) in the housing 101 located below the cylindrical blade 103 for dispensing grated material. Further depicted is a press 115 movably connected to the housing 101. The press 115 pushes a material to be grated into the cylindrical blade 103 by way of force from a user's hand or fingers. The press 115 is movably connected to the housing 101 by way of a hinge or similar apparatus. As the material to be grated gets smaller, the press 115 moves the material to be grated closer to the cylindrical blade while protecting the user's fingers from injury. In some embodiments of the present invention there is a lever 1403 (not shown in FIG. 1, see FIG. 14) connected to the press 115 to allow a user to move the press 115 either into or out of the cylindrical housing envelope. The press 115 and lever 1403 may be made from a plastic, and will be further described and depicted herein. A storage device 109 is formed generally as an elliptical cylinder, or with a geometry similar to that of the housing 101. The storate device 109 is removably connected to the housing 101 for receiving and storing grated material. The storage device 109 may be made from a plastic and further may have a flange 117 that circumscribes the storage device 109 such that it may be retained by a flange receiver 119 that is formed into the housing 101. A lid 111 may also be retained by the storage device 109 by way of a lid retainer 227 (depicted in FIG. 2) for subsequent covering of grated material that may be contained in the storage device 109.

Figure 2:
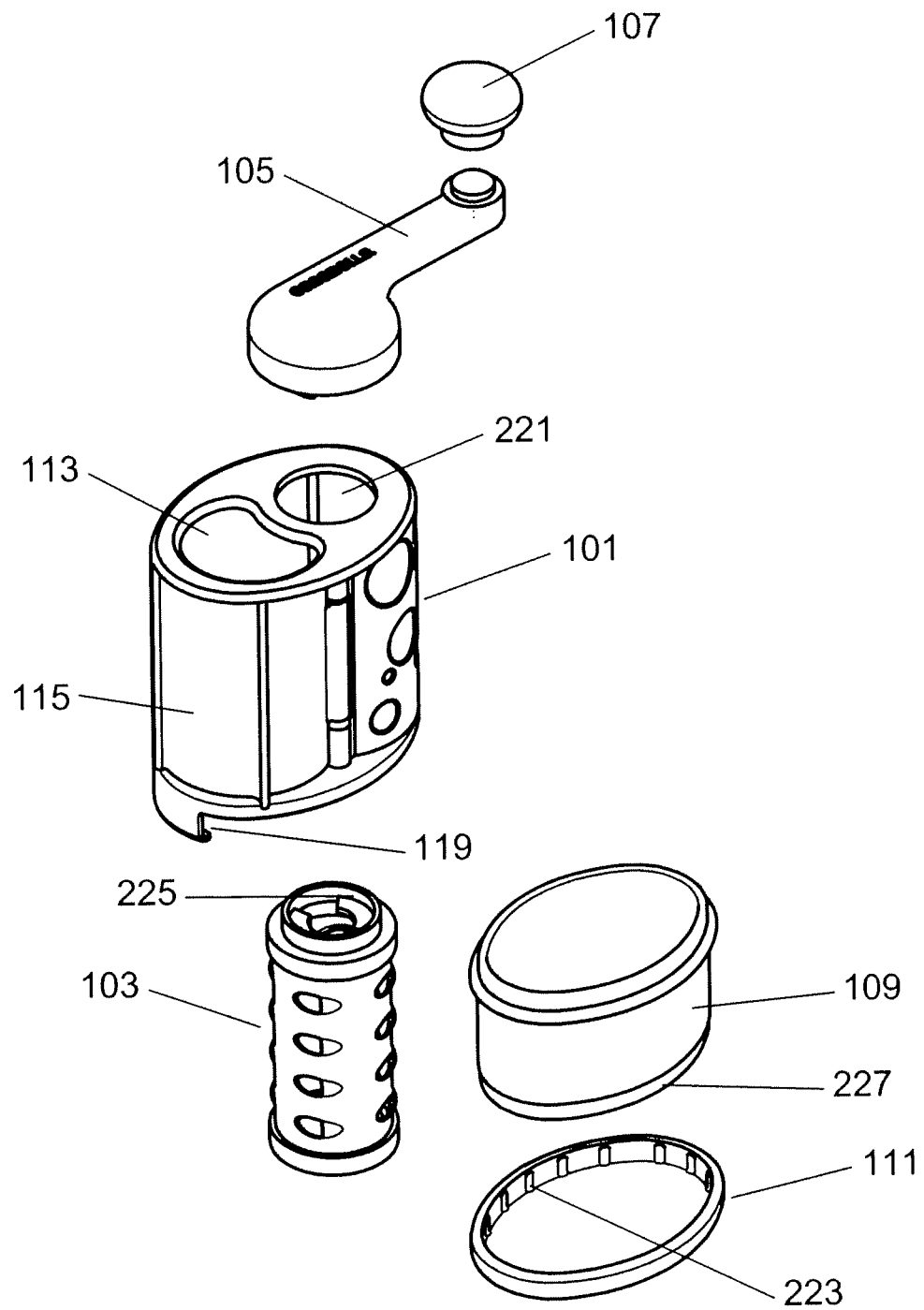
FIG. 2 is an exploded perspective view of the rotary grater with storage device.

FIG. 2 is an exploded perspective view of the rotary grater with storage device. The lid retainer 227 can be seen as a reduced size area of the storage device 109. Further, knurls 223 can be seen within an inner edge for retaining the lid 111 to the storage device 109 at either the top of the storage device 109 or the lid retainer 227. The knurls 223 are features such as bumps, ridges, grooves, or the like and serve to increase the friction and binding force between the lid 111 and the storage device 109.

Also depicted in FIG. 2 is a handle opening 221 that allows the handle 105 to couple with the cylindrical blade 103 so that the cylindrical blade can be rotated by movement of the handle 105. The cylindrical blade 103 can also be seen with a bowtie connector receiver hub 225 that may be made of a material such as a plastic.

Figure 3:
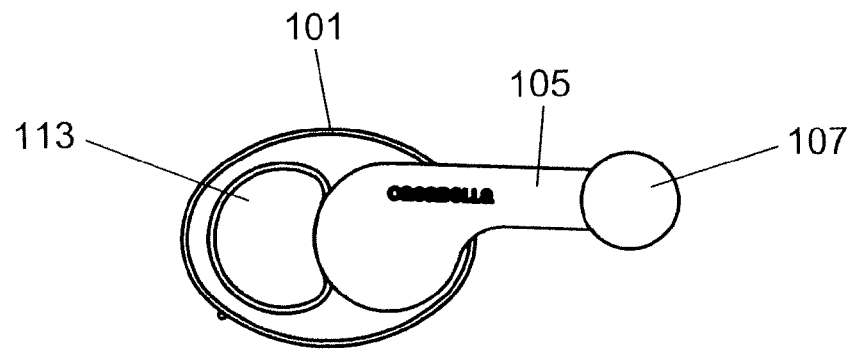
FIG. 3 is a top plan view of the rotary grater with storage device.
Figure 4:
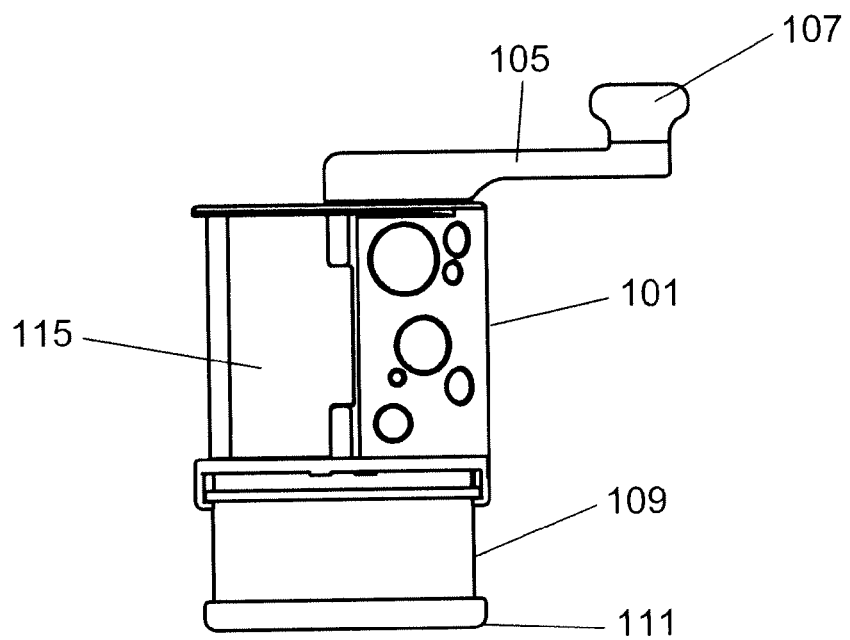
FIG. 4 is a long side plan view of the rotary grater with storage device.
Figure 5:
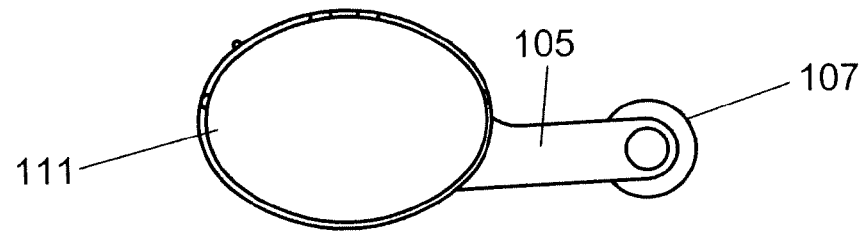
FIG. 5 is a bottom plan view of the rotary grater with storage device.

FIG. 3 is a top plan view of the rotary grater with storage device and FIG. 4 is a long side plan view of the rotary grater with storage device. FIG. 5 is a bottom plan view of the rotary grater with storage device where the lid 111 can be seen retained by the lid retainer 227 as further depicted in FIG. 18. The handle 105 can be seen with the knob 107 where the knob 107 is free to rotate with respect to the handle 105 by way of a joint, socket, pin, or similar arrangement, thus allowing a user to grasp the knob 107 and rotate the handle 105, imparting rotary motion to the cylindrical blade 103.

Figure 6:
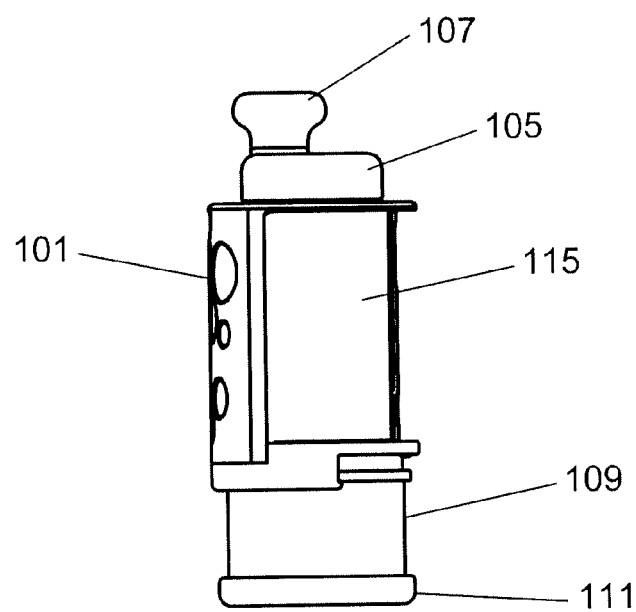
FIG. 6 is a short side view of the rotary grater with storage device.

FIG. 6 is a short side view of the rotary grater with storage device. The flange 117 and flange receiver 119 can be seen in cooperation to retain the storage device 109 to the housing 101.

Figure 7:
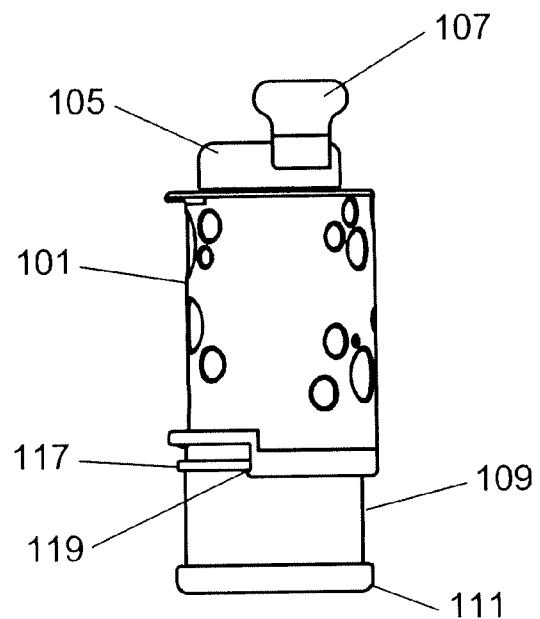
FIG. 7 is an opposing short side view of the rotary grater with storage device.

FIG. 7 is an opposing short side view of the rotary grater with storage device.

Figure 8:
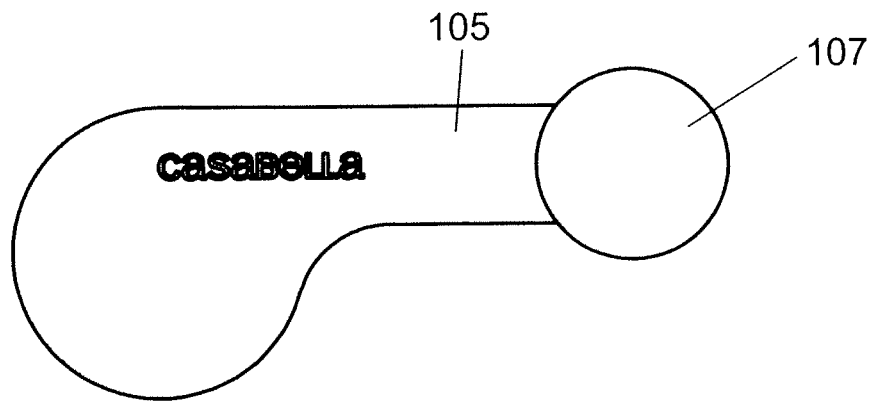
FIG. 8 is a top plan view of the handle of the rotary grater with storage device.
Figure 9:
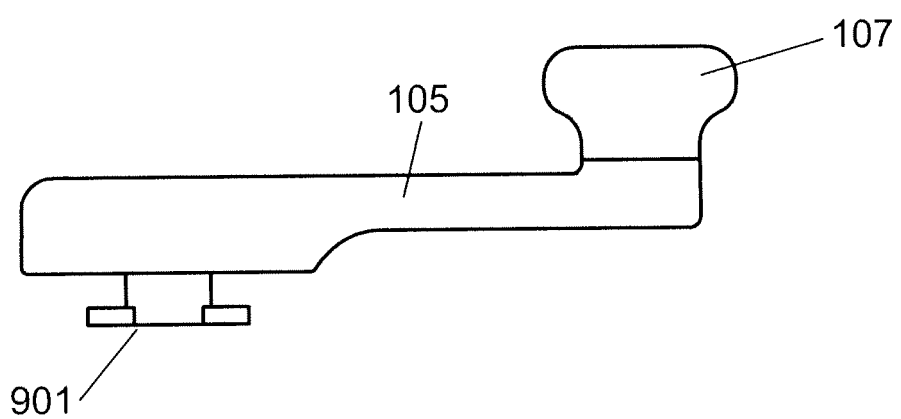
FIG. 9 is a side plan view of the handle of the rotary grater with storage device.
Figure 10:
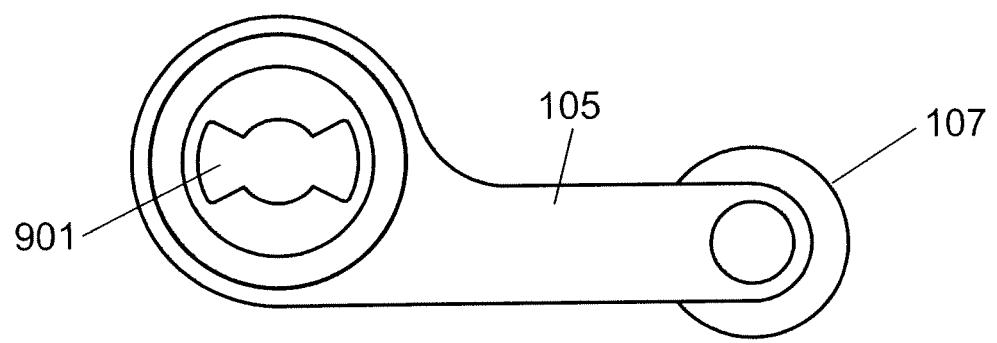
FIG. 10 is an underside plan view of the handle of the rotary grater with storage device.

FIGS. 8-10 depict various views of the handle 105 and related structures.

FIG. 8 is a top plan view of the handle of the rotary grater with storage device where the knob 107 can be seen movably connected to the handle 105.

FIG. 9 is a side plan view of the handle of the rotary grater with storage device. A bowtie connector 901 can be seen protruding from the lower part of the handle 105. The bowtie connector provides a releasable connection from the handle 105 to the cylindrical blade 103 (not shown in FIG. 9). This releasable connection allows a user to easily disassemble and clean the rotary grater, and to easily and quickly change cylindrical blades.

FIG. 10 is an underside plan view of the handle of the rotary grater with storage device showing clearly the bowtie connector 901. The bowtie connector 901 mates with the bowtie connector receiver hub 225 that is attached to the cylindrical blade 103, as seen in FIG. 2 and subsequently in FIGS. 20-25. The bowtie connector 901 may be made from a plastic similar to that of the handle 105, or may be molded with the handle 105.

The housing 101, as depicted in FIGS. 1 and 2, may be made from a material such as a plastic or a metal. In some embodiments of the present invention, the housing 101 comprises a lower part and an upper part that are attached together by way of an adhesive, a weld, snap fittings, screws, or the like.

Figure 11:
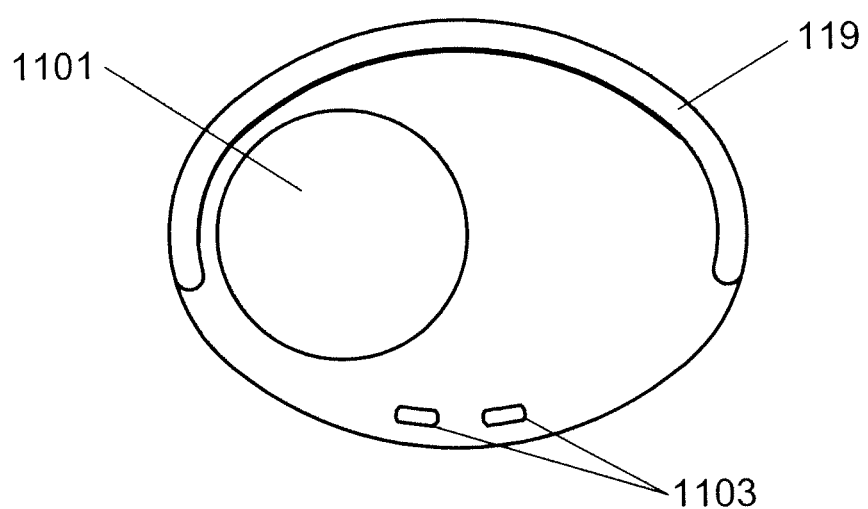
FIG. 11 is a bottom plan view of the lower part of the housing of the rotary grater.

FIG. 11 is a bottom plan view of the lower part of the housing of the rotary grater. An exit opening 1101 is depicted that is situated below the cylindrical blade when in use, and serves to dispense grated material to be received by the storage device 109 (see FIG. 1). Further, retention tabs 1103 can be seen on the bottom of the lower part of the housing that comprise bumps, ridges, grooves, or the like, and serve to retain the storage device 109 (see FIG. 1) by directing force to a rim or edge of the storage device 109.

Figure 12:
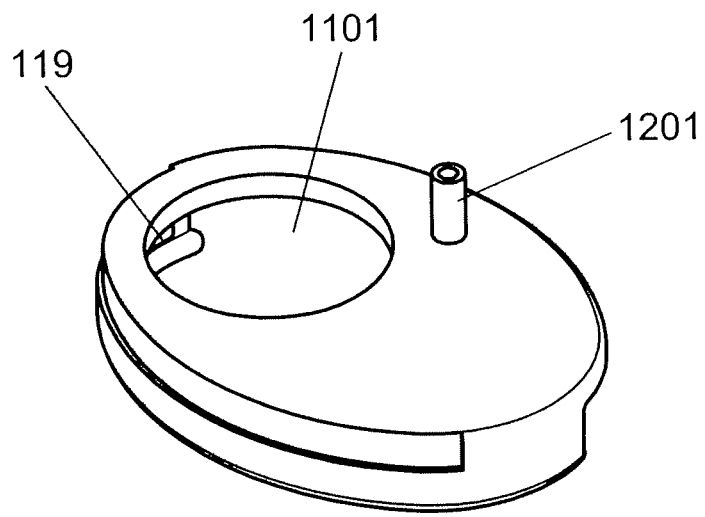
FIG. 12 is a perspective view of the lower part of the housing of the rotary grater.

FIG. 12 is a perspective view of the lower part of the housing of the rotary grater. A lower hinge receiver 1201 can be seen for coupling to the press 115 (see FIG. 1). The lower hinge receiver 1201 may be, for example, molded with the lower part of the housing of the rotary grater using standard plastic injection molding techniques.

Figure 13:
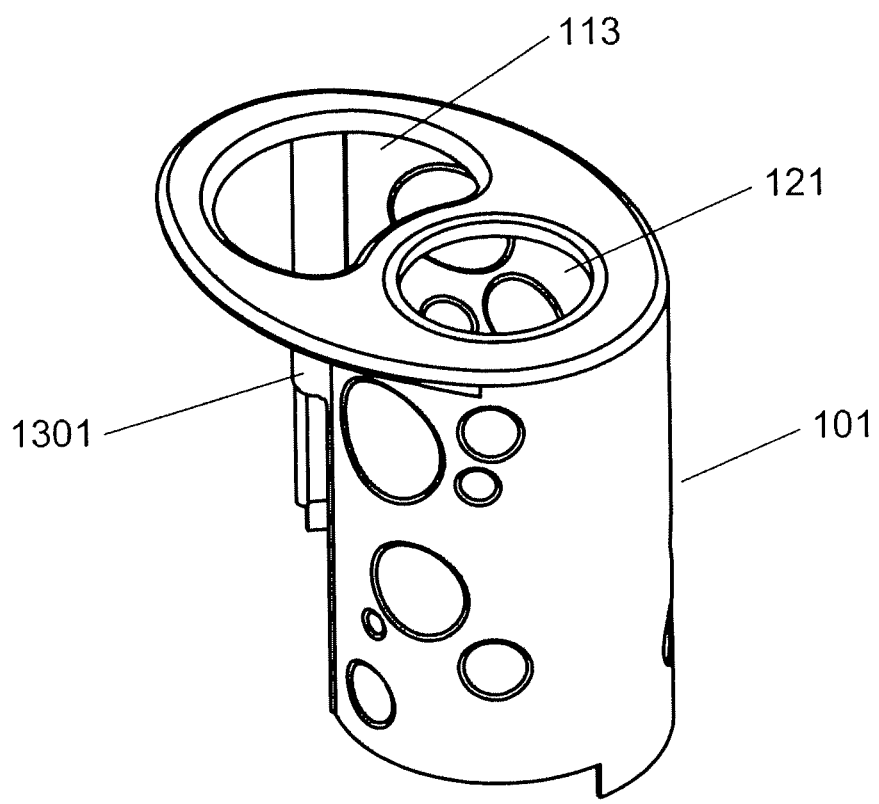
FIG. 13 is a perspective view of the upper part of the housing of the rotary grater.

FIG. 13 is a perspective view of the upper part of the housing of the rotary grater. An upper hinge receiver 1301 can be seen for coupling to the press 115 (see FIG. 1). The upper hinge receiver 1301 may be, for example, molded with the upper part of the housing of the rotary grater using standard plastic injection molding techniques.

FIGS. 14-17 depict the press of the rotary cheese grater. The press 115 is made from a plastic such as, for example, acrylonitrile butadiene styrene (ABS). The press may also be referred to as a door. The press 115 generally conforms to the shape of the housing 101.

FIG. 14 is a top plan view of the press of the rotary grater. A hinge 1401 may be connected to, or integrated or molded with, the press 115. A lever 1403 can be seen that allows a user to move the press towards or away from the cylindrical blade 103. A retaining edge 1405 can also be seen that acts to stop the press 115 from traveling too far outward, essentially retaining the press 115 within the confines of the housing envelope such that the material to be grated does not fall out of the rotary grater. The retaining edge 1405 may be integrated or molded with the press 115. The retaining edge 1405 further engages with a similar retaining edge or stop on the housing to prevent unwanted travel of the press. A small bump or extension may also be present on the housing 101 to engage with retaining edge 1405 of the press 115.

FIG. 15 is a perspective view of the press of the rotary grater showing a hinge rod 1501. The hinge rod 1501 may be made from a metal such as stainless steel and serves to couple the hinge 1401 on the press 115 with the lower hinge receiver 1201 (see FIG. 12) and the upper hinge receiver 1301 (see FIG. 13). The hinge rod 1501 in FIG. 15 is shown in exploded perspective for clarity. For a complete understanding of the press 115 and related hardware and features, FIG. 16 is a plan view of the outside of the press of the rotary grater and FIG. 17 is a plan view of the inside of the press of the rotary grater.

Figure 18:
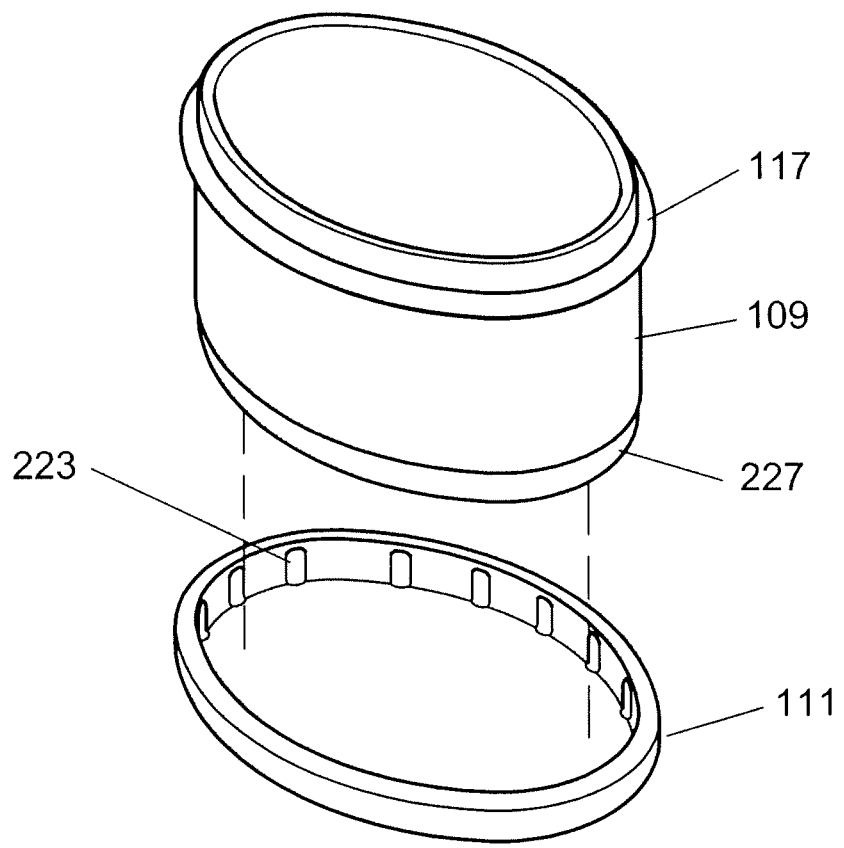
FIG. 18 is an exploded view of the storage device with lid.
Figure 19:
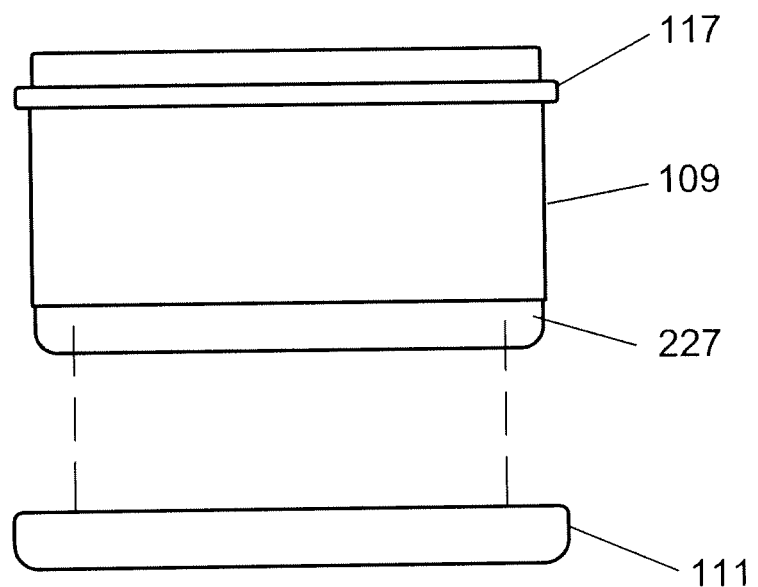
FIG. 19 is a side plan view of the storage device with lid.
Figures 20, 21:
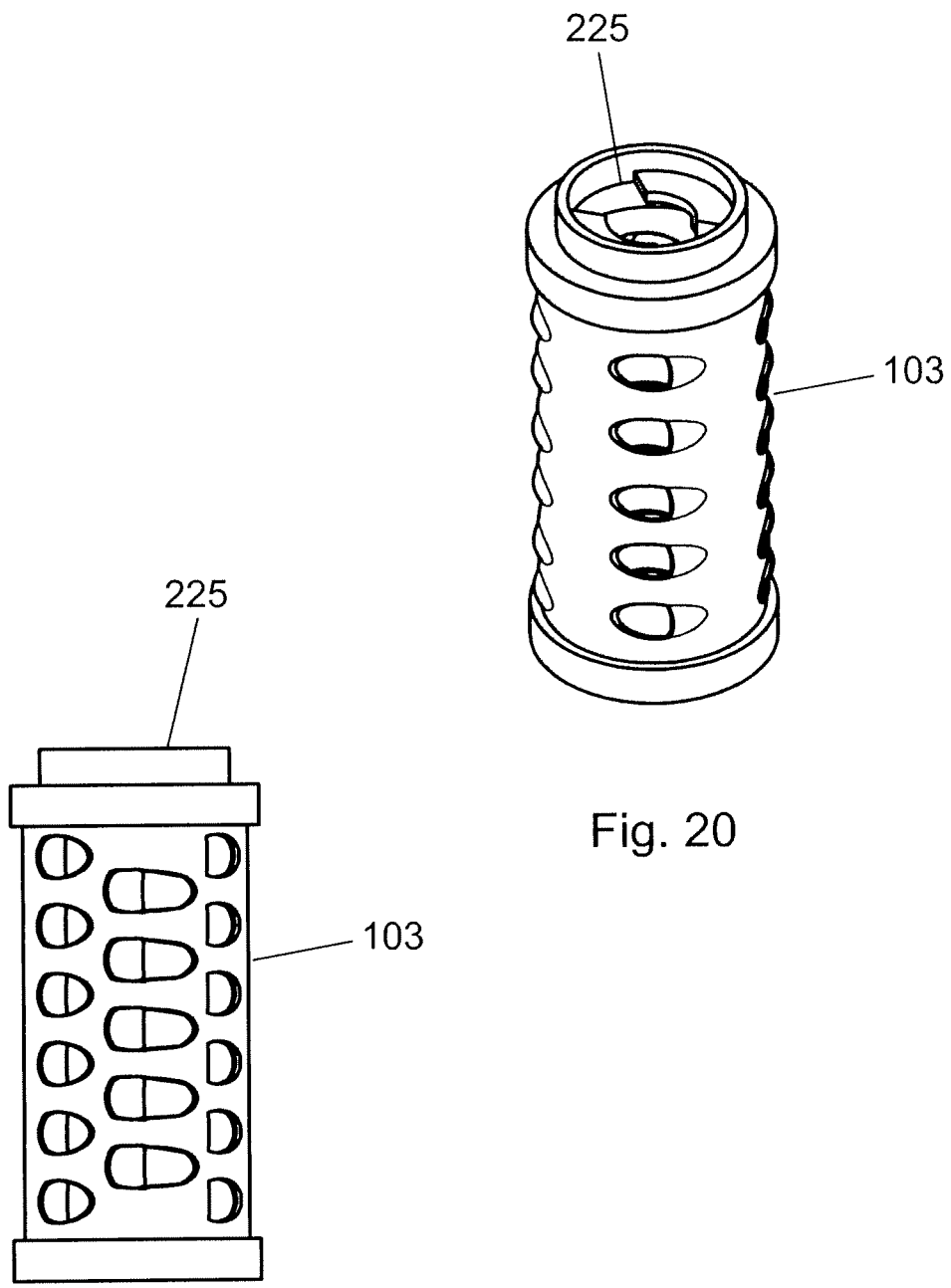
FIG. 20 is a perspective view of an exemplary cylindrical blade.
FIG. 21 is a side plan view of an exemplary cylindrical blade.
Figure 22:
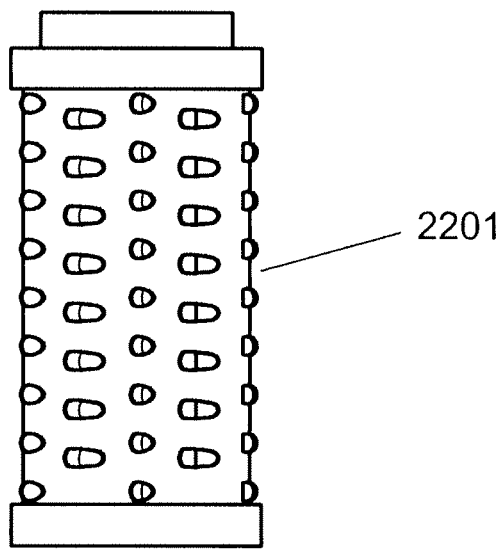
FIG. 22 is a side plan view of an exemplary cylindrical blade.
Figure 23:
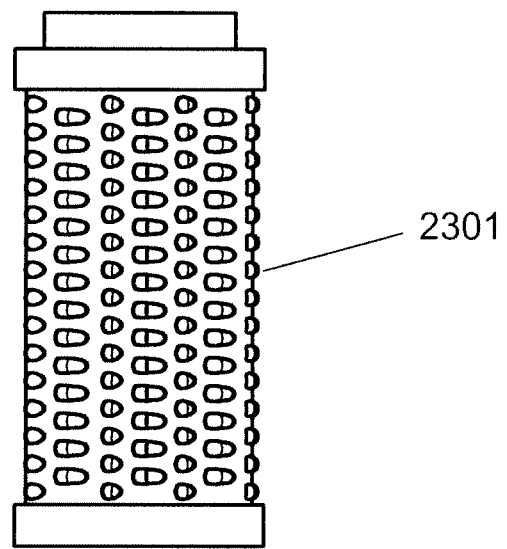
FIG. 23 is a side plan view of an exemplary cylindrical blade.

The storage device 109 and lid 111 can be seen detached from the housing 101 in FIGS. 18 and 19. FIG. 18 is an exploded view of the storage device 109 with lid 111. The storage device 109 may be made from a plastic such as, for example, acrylonitrile butadiene styrene (ABS). The lid 111 may be made from a softer durometer plastic to allow for easy placement of the lid 111 on the storage device 109. An example of such a plastic is ethylene-vinyl acetate (EVA). The lid 111 may, in some embodiments of the present invention, have knurls 223 that can be seen within an inner edge for retaining the lid 111 to the storage device 109 at either the top of the storage device 109 or the lid retainer 227. The knurls are features such as bumps, ridges, grooves, or the like and serve to increase the friction and binding force between the lid 111 and the storage device 109.

FIG. 19 is a side plan view of the storage device with lid that shows how the lid retainer 227 serves to retain the lid 111 when not in use.

FIGS. 20-23 depict various cylindrical blades with various size perforations. Smaller perforations generally produce smaller gratings, and perforation size and spacing is often times dependent on the application. For example, cheese may be grated course or fine. Chocolate may be grated in various sizes depending on the culinary application. Spices such as nutmeg are almost always grated with extremely small perforations to produce small particles of the spice so as not to overpower the food being prepared. The cylindrical blade 103 is made from a metal, such as a stainless steel, and has perforations as can be seen in the drawings. The perforations may, in some embodiments of the present invention, have a raised area around one side of each perforation to facilitate grating. The cylindrical blade 103 may be stamped from a sheet of metal to provide perforations and a raised area, and then rolled into a cylinder with the ends joined together by way of welding, crimping, or the like. The cylindrical blade 103 has a bowtie connector receiver hub 225 to facilitate removable connection of a handle 105 to the cylindrical blade. This hub arrangement will be further described by way of FIGS. 24 and 25.

Figure 24:
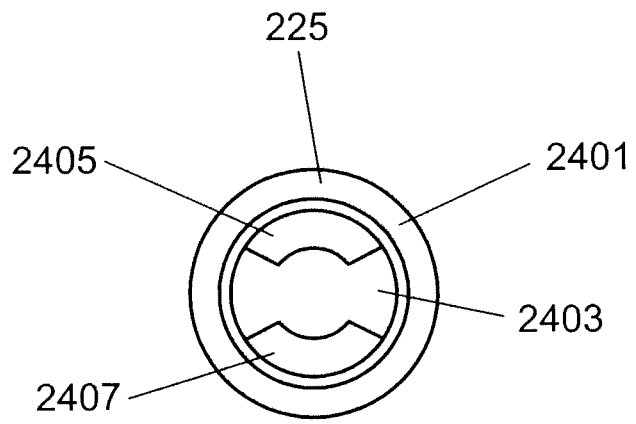
FIG. 24 is a top plan view of the bowtie connector receiver hub.

FIG. 24 is a top plan view of the bowtie connector receiver hub 225. A hub 2401 encompasses the end of a cylindrical blade 103 and rotates within the handle opening 221 (see FIG. 2) when the handle 105 turns the cylindrical blade 103. A first receiver part 2405 and a second receiver part 2407 make up a bowtie connector receiver 2403 that comprises an opening that is similar in shape to a bowtie. This bowtie connector receiver mates with the bowtie connector 901 that is attached to the handle 105 (see FIGS. 9 and 10). The mating of the bowtie connector 901 with the bowtie connector receiver 2403 provides for removable connection of the handle 105 to the cylindrical blade 103.

Figure 25:
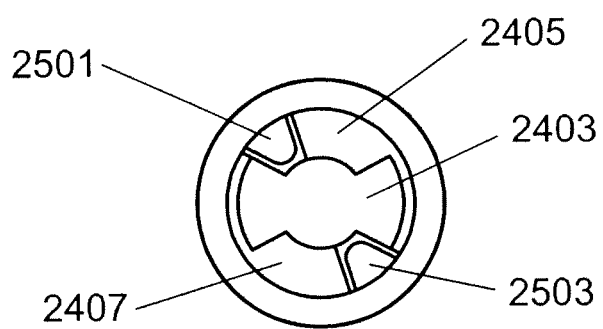
FIG. 25 is an inside plan view of the bowtie connector receiver hub.

FIG. 25 is an inside plan view of the bowtie connector receiver hub looking up through the cylindrical blade 103. A first receiver part stop 2501 and a second receiver part stop 2503 can be seen. These stops provide a fixed point such that the handle turns the cylindrical blade 103, and does not merely spin freely through the bowtie connector arrangement. The bowtie connector receiver hub 225 is made from a plastic such as, for example, polypropylene. A secondary hub, depicted at the opposite end of the cylindrical blade 103 from the bowtie connector receiver hub 225, as seen in FIGS. 20-23 for example, serves to rotate within the exit opening as the handle 105 turns the cylindrical blade 103, serving as a bearing or bushing of sorts. This secondary hub may also be made from a plastic such as, for example, polypropylene. Both hubs are attached to the cylindrical blade by an adhesive, locking tabs, crimps, or the like.

To use the Rotary Grater With Storage Device, a piece of material to be grated is placed through the entry opening 113 and the press 115 is moved inward by way of the lever 1403 so that the material to be grated makes contact with the cylindrical blade 103. The handle 105 is rotated such that the cylindrical blade 103 in turn rotates, and grated material exits the rotary grater and enters the storage device 109. Once a suitable amount of material is grated, the storage device 109 is removed from the housing 101. Additional grated material may be stored in the storage device 109 and sealed with the lid 111.

It is, therefore, apparent that there has been provided, in accordance with the various objects of the present invention, a rotary grater with storage device. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A rotary grater comprising:
   a housing comprising an elliptical cylinder;
   a cylindrical blade having a plurality of perforations with a raised area around one side of each perforation to facilitate grating and disposed within the housing;
   a handle connected to the cylindrical blade;
   an entry opening at the top of the housing for receiving a material to be grated;
   an exit opening in the housing located below the cylindrical blade for dispensing grated material that passes through the cylindrical blade;
   a handle opening in the housing to facilitate connection of the handle to the cylindrical blade;
   a press movably connected to the housing wherein the press spans less than half of the perimeter of the elliptical cylinder;
   a lever connected to the press; and
   a storage device comprising an elliptical cylinder and removably connected to the housing for receiving and storing grated material whereas the axis of rotation of the cylindrical blade is vertical.

2. The rotary grater of claim 1, further comprising a flange circumscribing the storage device.

3. The rotary grater of claim 2, further comprising a flange receiver formed into the housing for retaining the storage device.

4. The rotary grater of claim 1, further comprising a knob connected to the handle.

5. The rotary grater of claim 1, further comprising an elliptically shaped lid.

6. The rotary grater of claim 5, wherein the elliptically shaped lid has knurls within an inner edge for retaining the lid to the storage device.

7. The rotary grater of claim 1, further comprising a lid retainer formed into the storage device.

8. The rotary grater of claim 1, further comprising a bowtie connector receiver hub coupled to the cylindrical blade and a bowtie connector coupled to the handle.

9. The rotary grater of claim 8, further comprising a first receiver part stop and a second receiver part stop coupled to the bowtie connector receiver hub.

10. The rotary grater of claim 1, further comprising retention tabs connected to the bottom surface of the housing for retaining the storage device to the housing.

11. The rotary grater of claim 1, further comprising a retaining edge connected to the press.

12. The rotary grater of claim 1, further comprising a stop connected to the housing for limiting the amount of travel of the press in relation to the cylindrical blade.

13. The rotary grater of claim 1, further comprising a hinge connected to the press, a lower hinge receiver connected to the housing, an upper hinge receiver connected to the housing, and a hinge rod joining the hinge to the lower hinge receiver and the upper hinge receiver.

14. The rotary grater of claim 1, wherein the housing is made from a plastic.

15. The rotary grater of claim 1, wherein the press is made from a plastic.

16. The rotary grater of claim 1, wherein the storage device is made from a plastic.

17. The rotary grater 1, wherein the cylindrical blade is made from a stainless steel.

18. The rotary grater of claim 1, wherein the housing comprises an upper part and a lower part.

19. A rotary grater comprising:
   a housing comprising an elliptical cylinder;
   a cylindrical blade comprising a steel cylinder comprising perforations, a lower hub connected to the bottom of the steel cylinder, a bowtie connector receiver hub connected to the top of the steel cylinder wherein the bowtie connector receiver hub comprises a bowtie connector receiver opening, a first receiver part and a second receiver part, a first receiver part stop connected to the first receiver part and a second receiver part stop connected to the second receiver part;
   wherein the cylindrical blade is disposed within the housing;
   a handle connected to the cylindrical blade;
   an entry opening at the top of the housing for receiving a material to be grated;
   an exit opening in the housing located below the cylindrical blade for dispensing grated material that passes through the cylindrical blade;
   a handle opening in the housing to facilitate connection of the handle to the cylindrical blade;
   a press movably connected to the housing wherein the press spans less than half of the perimeter of the elliptical cylinder;
   a lever connected to the press; and
   a storage device comprising an elliptical cylinder and removably connected to the housing for receiving and storing grated material whereas the axis of rotation of the cylindrical blade is vertical.

* * * * *